(12) United States Patent
Cabaj et al.

(10) Patent No.: US 9,541,116 B2
(45) Date of Patent: Jan. 10, 2017

(54) ANCHOR FASTENER INCLUDING AN EXPANSION SLEEVE

(71) Applicant: ILLINOIS TOOL WORKS INC., Glenview, IL (US)

(72) Inventors: Stanley J. Cabaj, Park Ridge, IL (US); Yongping Gong, Wilmette, IL (US)

(73) Assignee: Illinois Tool Works Inc., Glenview, IL (US)

( * ) Notice: Subject to any disclaimer, the term of this patent is extended or adjusted under 35 U.S.C. 154(b) by 141 days.

(21) Appl. No.: 14/505,716

(22) Filed: Oct. 3, 2014

(65) Prior Publication Data

US 2016/0097416 A1    Apr. 7, 2016

(51) Int. Cl.
*F16B 13/06* (2006.01)
*F16B 29/00* (2006.01)

(52) U.S. Cl.
CPC .............. *F16B 29/00* (2013.01); *F16B 13/065* (2013.01)

(58) Field of Classification Search
CPC ............................. F16B 13/065; F16B 13/066
USPC ...................................................... 411/71–74
See application file for complete search history.

(56) References Cited

U.S. PATENT DOCUMENTS

| | | | |
|---|---|---|---|
| 925,006 A | 6/1909 | Mason | |
| 1,000,715 A | 8/1911 | Caywood | |
| 1,065,747 A * | 6/1913 | Tuck | E21D 21/008 411/70 |
| 1,115,205 A | 10/1914 | Johnson | |
| 1,164,322 A * | 12/1915 | Yeatman | F16B 13/066 411/55 |
| 1,470,858 A * | 10/1923 | Maxwell | E05B 9/084 16/220 |
| 4,481,702 A * | 11/1984 | Mitchell | F16B 13/066 29/432 |
| 4,720,224 A | 1/1988 | Peterken | |
| 4,904,135 A | 2/1990 | Barthomeuf et al. | |
| 4,929,134 A | 5/1990 | Bergner | |
| 5,314,278 A * | 5/1994 | Weber | F16B 13/065 411/55 |
| 5,419,664 A * | 5/1995 | Hengesbach | F16B 13/065 405/259.1 |

(Continued)

OTHER PUBLICATIONS

International Search Report and Written Opinion for International Application No. PCT/US2015/052851, mailed Dec. 11, 2015 (12 pages).

(Continued)

*Primary Examiner* — Flemming Saether
(74) *Attorney, Agent, or Firm* — Neal, Gerber & Eisenberg LLP (57) ABSTRACT

A fastener including a body having a threaded portion and an opposing, tapered portion, where the tapered portion includes an outwardly angled surface, and a sleeve movably connected to the body. The sleeve includes a plurality of fingers at least partially separated from each other, where each of the fingers includes at least two, axially spaced gripping members protruding from the body. When the fastener is inserted in a borehole formed in a substrate and a fastening member is threaded onto the threaded portion and tightened, the sleeve progressively moves along the angled surface causing the fingers to move outwardly and at least one of the gripping members to engage an inner surface of the substrate forming the borehole to secure the fastener in the borehole.

20 Claims, 5 Drawing Sheets

(56) References Cited

U.S. PATENT DOCUMENTS

| | | |
|---|---|---|
| 5,690,455 A | 11/1997 | Fischer et al. |
| 5,911,550 A | 6/1999 | Popp et al. |
| 6,270,303 B1 | 8/2001 | Gauthier et al. |
| 6,524,046 B2 * | 2/2003 | Hsu .................... F16B 13/0858 411/51 |
| 6,827,535 B2 * | 12/2004 | Fuchs ................... F16B 1/0071 411/44 |
| 6,829,871 B1 | 12/2004 | McSherry et al. |
| 7,587,873 B2 | 9/2009 | McSherry et al. |
| 7,744,320 B2 | 6/2010 | Kobetsky et al. |
| 7,811,037 B2 | 10/2010 | Kobetsky et al. |
| 8,251,625 B2 | 8/2012 | Zimmer et al. |
| 8,287,218 B2 | 10/2012 | Zimmer et al. |
| 8,302,276 B2 | 11/2012 | Kobetsky et al. |
| 8,491,244 B2 | 7/2013 | Kobetsky et al. |
| 8,974,163 B2 * | 3/2015 | Ricketts ................ F16B 13/063 411/45 |
| 2004/0096288 A1 * | 5/2004 | Haug ................... F16B 13/065 411/57.1 |
| 2010/0272536 A1 | 10/2010 | Kaplan et al. |
| 2012/0263553 A1 | 10/2012 | Greenfield |
| 2014/0072384 A1 | 3/2014 | Wissling |

OTHER PUBLICATIONS

"Concrete Anchor Bolts for Pedestrian Barrier" web page by Global Industrial printed Jun. 30, 2104.

"Wedge Anchors" web page by Concrete Fastening Systems printed Jun. 30, 2104.

"Dock Bumper Installation Bolt" web page by Global Industrial printed Jun. 30, 2104.

"Trubolt+ Seismic Wedge" brochure by Red Head Concrete Anchoring dated Feb. 2012.

* cited by examiner

ANCHOR FASTENER INCLUDING AN EXPANSION SLEEVE

BACKGROUND

The present disclosure relates generally to fasteners, and more specifically to anchor fasteners for securing structures, sub-structures and construction joints to a cement foundation or substrate.

Fasteners are used in construction to secure structures, such as frames and joints, to various types of supports such as wood or metal studs. Fasteners are also used to secure structures to cement or concrete substrates or the like. One type of fastener used to secure such structures to cement or concrete is an anchor assembly such as an anchor bolt. Examples of such anchor assemblies are disclosed in U.S. Pat. Nos. 1,000,715; 1,115,205; 4,720,224, 4,904,135; 4,929,134; and 5,911,550. Anchor assemblies, such as anchor bolts, must meet certain performance standards and capabilities developed by cracked concrete testing procedures described in U.S. Pat. Nos. 7,744,320; 7,811,037; 8,302,276; and 8,491,244, which are incorporated herein by reference. In particular, it is important for anchor assemblies to resist failure under designated loads and exhibit high pull-out resistance and long service lives. Additionally, anchor assemblies must securely and reliably affix structures to cement substrates, structures and substructures.

Accordingly, there is a need to improve the failure resistance, pull-out resistance and service lives of anchor assemblies for securely affixing structures to cement substrates, structures and substructures.

SUMMARY

The foregoing and other objectives are achieved in accordance with the presently described teachings and principles through the provision of an anchor fastener including an expansion sleeve.

In an embodiment, a fastener is provided that includes a body having a threaded portion and an opposing, tapered portion, where the tapered portion includes an outwardly angled surface, and a sleeve movably connected to the body. The sleeve includes a plurality of fingers at least partially separated from each other, where each of the fingers includes at least two, axially spaced gripping members protruding from the body. When the fastener is inserted in a borehole formed in a substrate and a fastening member is threaded onto the threaded portion and tightened, the sleeve progressively moves along the angled surface, causing the fingers to move or flare outwardly and at least one of the gripping members to engage an inner surface of the substrate forming the borehole to secure the fastener in the borehole.

In another embodiment, a fastener is provided that includes an integral body having a threaded portion, an opposing, tapered portion and an outwardly extending lip, where the tapered portion includes an outwardly angled surface. A clip is slidably connected to the body between the tapered portion and the lip, the clip including a plurality of at least partially separated fingers, each of the fingers including at least three, axially spaced gripping members protruding from the body, where at least two of the gripping members are radially offset from each other. Furthermore, each of the gripping members projects a radial distance from the body where the radial distance of each of the gripping members progressively increases from the tapered portion to the threaded portion of the clip. When the fastener is inserted in a borehole formed in a substrate and a fastening member is threaded onto the threaded portion and tightened, the clip progressively moves along the angled surface causing the fingers to move outwardly, and at least two of the gripping members to sequentially engage an inner surface of the substrate forming the borehole to secure the fastener in the borehole.

DETAILED DESCRIPTION

The present disclosure relates generally to fasteners for securing structures, substructures, a frame or other building structures to a substrate, and more specifically, to anchor fasteners for securing such structures to a cement substrate.

Figure 1:
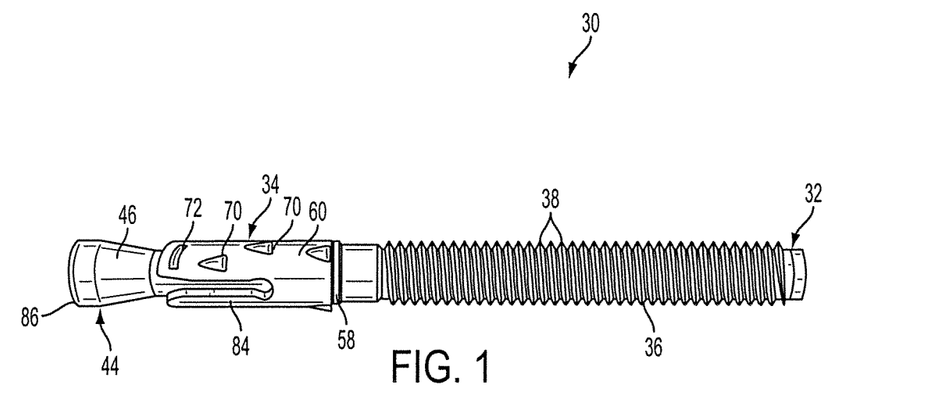
FIG. 1 is a perspective view of the present anchor bolt.
Figure 2:
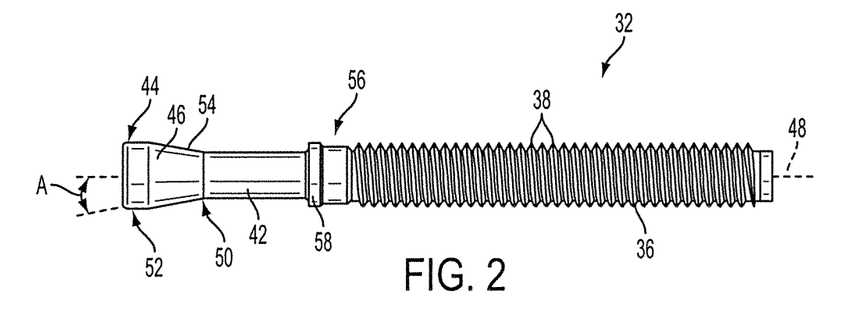
FIG. 2 is a fragmentary side view of the anchor bolt of FIG. 1.
Figure 3:
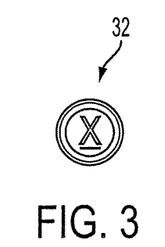
FIG. 3 is an end view of a first end of the anchor bolt of FIG. 1.
Figure 4:
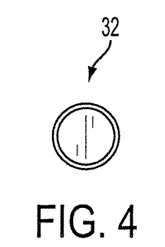
FIG. 4 is an end view of a second, opposing end of the anchor bolt of FIG. 1.
Figure 5:
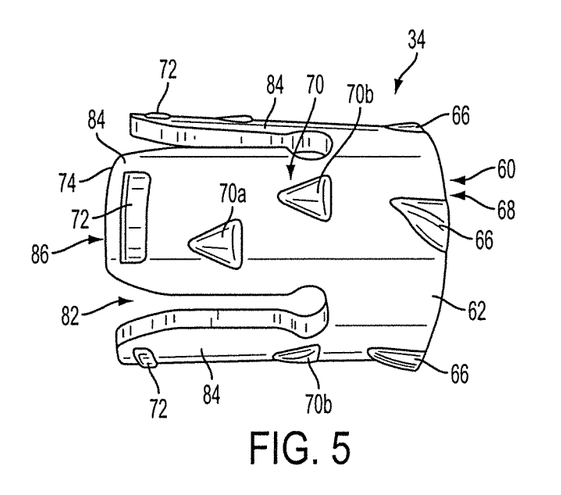
FIG. 5 is a side perspective view of an embodiment of the clip on the anchor bolt of FIG. 1.

Referring to FIGS. 1-11, an example of an anchor fastener of the present disclosure is illustrated where the anchor fastener is an anchor bolt generally designated 30. The anchor bolt 30 includes an integrally formed body 32 and an expansion sleeve or clip 34 that is movably connected to at least a portion of the body. The body 32 is formed to a designated length and diameter, which may be any suitable length or diameter. As shown in FIG. 2, the body 32 includes a threaded portion 36 having a series of threads 38 that are configured to matingly engage a fastening member, such as hex nut 40 (FIG. 12A), or other suitable fastener, a generally cylindrical mandrel portion 42 (FIG. 2) and a tapered portion or wedge portion 44. The tapered portion 44 has an angled head 46 that extends outwardly at a designated angle "A" relative to a longitudinal axis 48 extending through the center of body 32, where the designated angle is preferably 9.5° to 10.5°. It should be appreciated that the angle "A" of the tapered portion may be any suitable angle.

Generally, the angled head 46 has a first diameter 50, which is the outer diameter of the mandrel portion 42, and a second diameter 52, which is the largest outer diameter of the angled head 46, and an angled surface 54 that extends from the portion having the first diameter 50 to the portion having the second diameter 52. In the illustrated embodiment, the angled surface 54 is at an angle of 10° relative to the longitudinal axis of the body but may be any suitable angle. The body 32 also includes a cylindrical collar 56 that is embossed or otherwise formed on the body between the mandrel portion 42 and the threaded portion 36.

As shown in FIG. 2, the collar 56 has a lip 58 that radially extends from the body 32. The lip 58 helps to prevent the clip 34 from falling off of or separating from the body 32 as the anchor fastener 30 is inserted in a borehole. As stated above, the body 32 is integrally formed and made with a metal such as stainless steel, galvanized steel or other suitable material or combination of materials.

Figure 6:
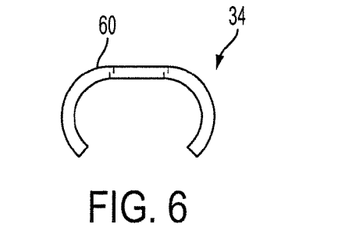
FIG. 6 is a top view of the clip of FIG. 5.

Referring now to FIGS. 5-11, the clip 34 has an integrally formed body 60 made of a metal, such as stainless steel or galvanized steel, and is initially formed as a flat, rectangular plate 62 that is at least partially curved or bent around the body 32 (see FIGS. 1 and 6). A bottom, inside surface 63 of the plate (FIG. 10) is formed at an angle (preferably 9.5° to 10.5°) that matches the angle "A" of the tapered portion 44 to facilitate movement of the clip along the surface of the tapered portion. A front surface or outer surface 64 of the plate 62 includes three angular, spaced embossments or nibs 66 at a top edge 68 of the plate, a plurality of gripping members, such as triangular embossments 70, and plurality of lower securing members, such as rectangular embossments 72, at the bottom end or bottom edge 74 of the plate.

In the example embodiment, the three angular nibs 66 at the top edge 68 of the plate 62 are spaced equally apart at a designated distance from each other and have a generally first, straight side 76 and an angled side 78. The angled side 78 forms an angle of 20° relative to the longitudinal axis of the body 60, but may be any suitable angle. Further, the angles of the angled sides 78 of the barbs 66 may be the same angle or different angles. In use, the angular barbs 66 extend into an adjacent surface, such as an inner surface of a cement substrate forming a borehole, to grip the inner surface to help prevent the anchor bolt from sliding out of the borehole and to help prevent rotational movement of the clip 34 during rotation of the fastening member, i.e., hex nut 40.

The rectangular embossments 72 at the bottom edge 74 of the clip 34 also engage the inner surface of the substrate and help maintain the clip at a designated position relative to the inner surface. Otherwise, the clip 34 could move prior to the anchor bolt 30 being tightened in the borehole and affect the load strength and stability of the bolt. In the illustrated embodiment, the lower securing members or lower embossments 72 have a rectangular shape but may be any suitable shape or size. Further, the plate 62 optionally includes one or a plurality of the lower securing members that are offset or aligned with each other.

Figure 7:
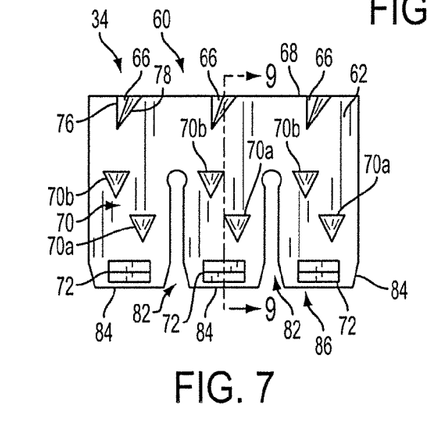
FIG. 7 is a front side view of the clip of FIG. 5.
Figure 8:
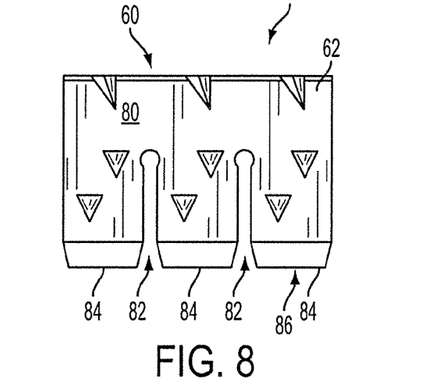
FIG. 8 is a rear side view of the clip of FIG. 5.
Figure 9:
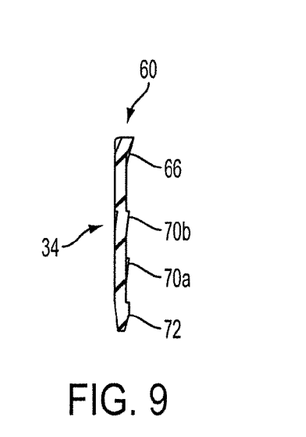
FIG. 9 is a cross-section of the clip taken substantially along line 9-9 in FIG. 7 and in the direction generally indicated.

Each embossment 70 in the three pairs of embossments has a generally triangular shape, with the point of each triangular embossment facing or extending toward the bottom end of tapered portion 44 of the body 32. Further, the embossments 70 each have an angled surface 71 (FIG. 10) forming an angle with the longitudinal axis of the body 32 where the angles of the embossments 70 may be the same angle or different angles. In the embodiment shown in FIG. 7, the bottommost embossment 71 extends a radial distance of 0.014 inches from the body 32 and is at an 8° angle relative to the longitudinal axis of the body, and the topmost embossment 71 extends a radial distance of 0.018 inches from the body and is at an 10° angle relative to the longitudinal axis. It should be appreciated that the embossments 71 may extend at any suitable radial distance or at any suitable angle relative to the body or longitudinal axis. Further, as shown in FIG. 7, each of the triangular embossments 70 are axially spaced and offset from each other. Offsetting the embossments 70 enables each embossment to contact and be at least partially embedded in independent sections of the surrounding cement forming the inner surface of the borehole without encountering any grooves, channels or other deformations formed in the inner surface by other embossments, which occurs with conventional anchor bolts. Thus, each embossment 70 independently contacts and grips the inner surface of the borehole to secure the clip 34, and thereby the anchor bolt 30, in the borehole. It should be appreciated that the three pairs of embossments 70 may be any size or shape. Also, the embossments 70 in each of the pairs of embossments may have the same shape or different shapes.

Figure 10:
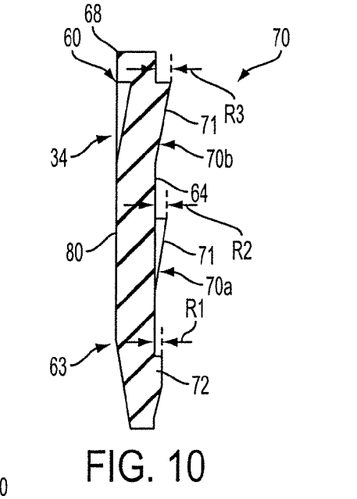
FIG. 10 is an enlarged cross-section view of a lower portion of the clip of FIG. 5.
Figure 11:
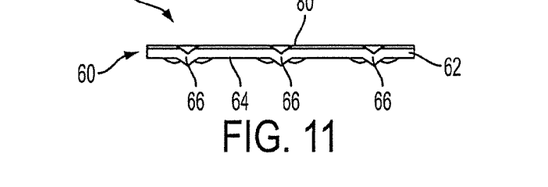
FIG. 11 is a top view of the clip of FIG. 5.

As shown in FIG. 10, each rectangular embossment 72 extends a first radial distance "R1" from the body 32 and the next embossment 70a (the lower embossment in the pair of embossments) extends a second radial distance "R2" from the body 32 where the second radial distance is greater than the first radial distance. Similarly, the topmost embossment 70b (the embossment closest to the threaded portion 36 of the body 32) extends a third radial distance "R3" from the body 32 which is greater than the second radial distance "R2." Thus, the radial distances of each of the embossments 72, 70a and 70b from the body 32 progressively increases from the tapered portion 44 to the threaded portion 36. Configuring the embossments 72, 70a and 70b to progressively extend a greater radial distance from the body 32 enables each of the embossments to contact and securely grip the inner surface of the borehole, thereby having multiple, distinct gripping points on the inner surface to securely hold the clip 34, as well as the anchor bolt 30, in the borehole. It should be appreciated that each of the embossments 70a, 70b and 72 may extend the same radial distance or different radial distances from the body 32 as shown in the illustrated embodiment.

The rear side 80 of the plate 62 is generally flat so that the clip 34 is able to move along the body 32, and more specifically, the mandrel portion 42 of the body. As shown in FIG. 7, the plate 62 includes two elongated slots or gaps 82 that divide the body 32 into three at least partially separated fingers 84 having generally the same size and shape. Each of the fingers 84 includes one of the pairs of offset triangular embossments 70. It should be appreciated that each of the fingers 84 may have one or a plurality of the embossments 70 for gripping an inner surface of a borehole or other surface. Having the separated fingers 84 enables each finger to independently move and contact the inner first surface of the borehole, thereby enabling the clip 34 to securely grip uneven surfaces or surfaces having deformities or other irregularities. It should be appreciated that the clip 34 may have two or more fingers 84 depending on the size and shape of the clip.

Figure 12A:
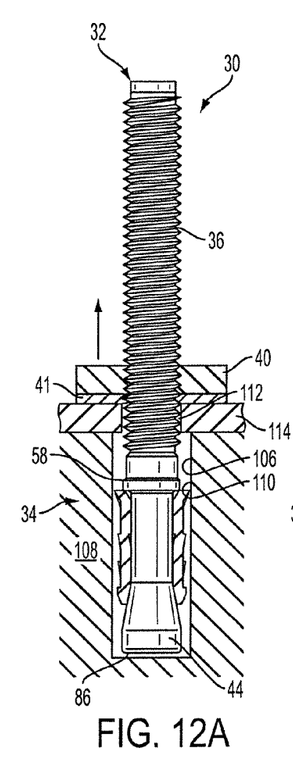
FIGS. 12A, 12B and 12C are each fragmentary, partial cross-sections of the anchor bolt of FIG. 1 showing the clip in different positions relative to the body of the anchor bolt as a fastening member is tightened on the threaded portion of the body.

Referring now to FIG. 12A, the anchor bolt 30 is initially inserted into a borehole 106 formed in a cement substrate 108 where the inner diameter of the borehole is approximately equal to the outermost diameter of the tapered portion 44 of the body 32. The tolerance between the inner diameter of the borehole and the outermost diameter of the tapered portion 44 is configured so that the bottom end 86 of the body 32 forms a friction fit with the inner surface 110 of the borehole 106. Typically, a hammer or similar tool is used to pound the anchor bolt 30 into the borehole 106 until the bottom end 86 of the tapered portion 44 contacts the bottom end of the borehole. After one or more anchor bolts 30 are inserted in corresponding borehole(s) 112, a structure 114 such as a wood or steel frame, having corresponding holes is placed over the anchor bolt or anchor bolts so that at least the threaded portion 36 of each anchor bolt 30 extends through the boreholes 112 in the structure 114. Next, one or more washers 41 are placed over the threaded portion 36 and a fastener, such as a hex nut 40 or other suitable fastener, is threaded onto the threaded portion 36 of the body 32 and rotated relative to the body to tighten the fastener and the washer onto the structure and secure it in place. Initially as shown in FIG. 12A, the clip 34 is in a first or initial position generally abutting the lip 58 of the collar 56. It should be appreciated that the fastener, i.e., hex nut 40, can be threaded onto the threaded portion 36 without the washer 41.

Figure 12B:
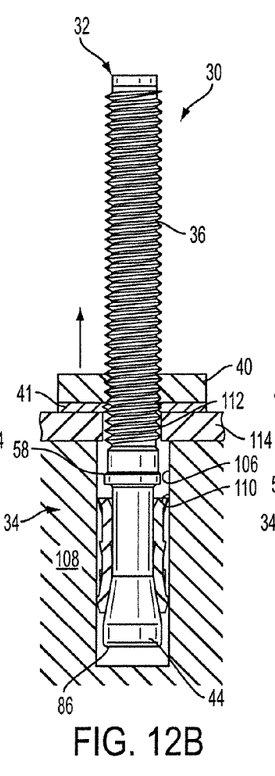

Referring to FIG. 12B, as the hex nut 40 is tightened against the washer 41 and the structure 114, the body 32 moves upwardly relative to the clip 34, simultaneously causing the tapered portion 44 to move upwardly within the clip. As the tapered portion 44 moves upwardly through the clip 34, each of the fingers 84 moves outwardly due to the engagement of the angled surface 54 against the inner surface of the fingers. The outward movement of the fingers 84 causes the first embossment, i.e., the bottom rectangular embossment 72, to engage an inner surface 110 of the borehole 106 to initially secure the anchor bolt 30 in position.

Figure 12C:
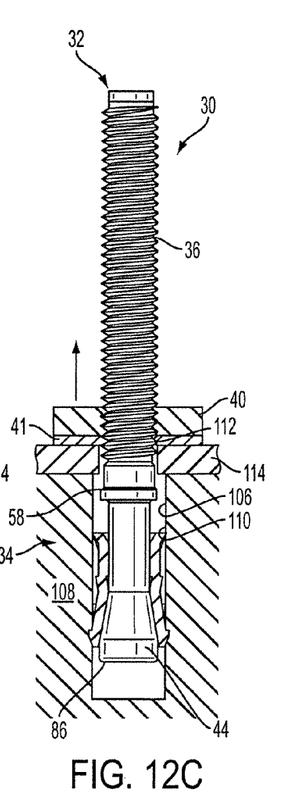
Figure 13:
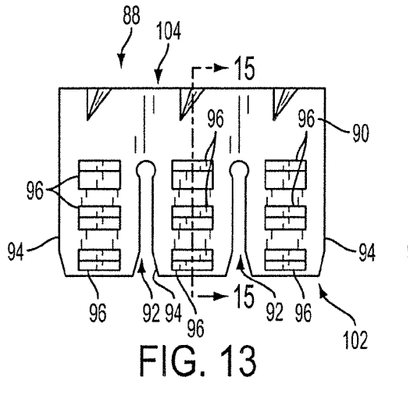
FIG. 13 is a front view of another embodiment of the clip.
Figure 14:
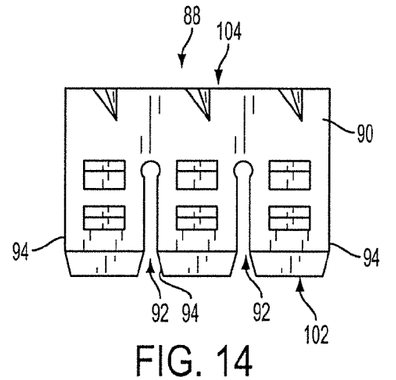
FIG. 14 is a rear view of the clip of FIG. 13.
Figure 15:
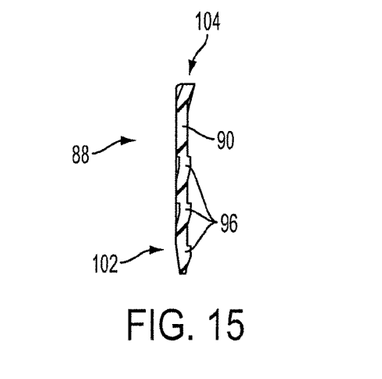
FIG. 15 is a cross-section view of the clip taken substantially along the line 15-15 in FIG. 13 and in the direction generally indicated.
Figure 16:
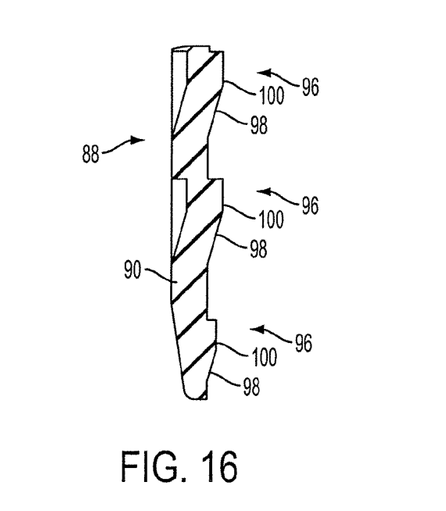
FIG. 16 is an enlarged cross-section of a lower portion of the clip of FIG. 15.
Figure 17:
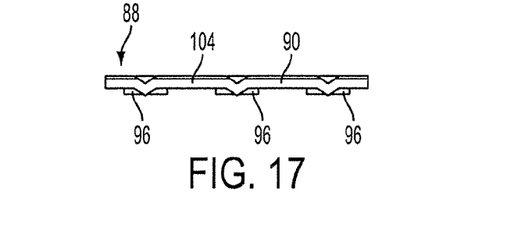
FIG. 17 is a top view of the clip of FIG. 13.

As shown in FIG. 12C, as the hex nut 40 is further tightened on the threaded portion 36 of the body 32, the body 32 moves further upwardly relative to the clip 34, thereby further pushing the fingers 84 of the clip outwardly from the body 32 to sequentially cause the second and third embossments 70a and 70b to contact and engage the inner surface 110 of the borehole 106. As stated above, staggering or offsetting the second and third embossments 70a and 70b enables each of the embossments to independently engage and grip different, independent points on the inner surface 110 of the borehole 106 (without engaging any grooves or other deformities in the inner surface of the borehole) to firmly secure the anchor bolt 30 in the borehole.

Referring now to FIGS. 13-17, another embodiment of the anchor fastener includes a clip 88 including a body 90 having two slots 92 forming the three fingers 94 as described above. In this embodiment, the three fingers 94 each include three generally rectangular embossments 96 where each embossment includes an angled surface 98 and a flat surface 100. The embossments 96 on each of the fingers 94 are axially aligned with each other and each engage an inner surface of a borehole as a fastener, such as hex nut 40 shown in FIGS. 12A to 12C, is tightened onto the anchor fastener body. It should be appreciated that the clip body 90 may have any suitable number of embossments, embossments that are aligned or offset from each other and/or embossments having any suitable shape or shapes. Each of the rectangular embossments 96 extend a radial distance from the body 90 where the radial distance increases from a bottom end 102 of the clip body (closest to the tapered portion) to the top end 104 (closest to the collar). With this configuration, the embossments 96 sequentially engage a concrete surface as the hex nut 40 is tightened on the threaded portion of the anchor fastener.

While particular embodiments of an anchor fastener have been described herein, it will be appreciated by those skilled in the art that changes and modifications may be made thereto without departing from the invention in its broader aspects and as set forth in the following claims.

What is claimed is:

1. A fastener comprising:
   a fastener body having a threaded portion and an opposing tapered portion, said tapered portion including an outwardly angled surface; and
   a sleeve movably connected to said body, said sleeve having a sleeve body including a plurality of fingers at least partially separated from each other, each of said fingers including at least two, axially spaced gripping members each protruding a maximum radial distance outwardly from said sleeve body, the maximum radial distance progressively increasing from the tapered portion to the threaded portion of the fastener body,
   wherein after the fastener is inserted in a borehole formed in a substrate and while a fastening member is threaded onto said threaded end and tightened, said sleeve progressively moves along said angled surface causing said fingers to move outwardly and at least one of said gripping members to engage an inner surface of the substrate forming the borehole to secure the fastener in the borehole.

2. The fastener of claim 1, wherein at least one of said gripping members has a triangular shape.

3. The fastener of claim 1, wherein at least one of said fingers includes an additional gripping member.

4. The fastener of claim 3, wherein said additional gripping member has a rectangular shape.

5. The fastener of claim 1, wherein said sleeve includes a peripheral edge and a plurality of barbs equally spaced apart about said edge.

6. The fastener of claim 5, wherein each of said barbs has a triangular shape.

7. The fastener of claim 1, wherein said fastener body includes a longitudinal axis and said angled surface forms about a 20° angle with said longitudinal axis.

8. The fastener of claim 1, wherein at least one of said gripping members has a rectangular shape.

9. The fastener of claim 8, wherein at least one said fingers includes an additional gripping member.

10. The fastener of claim 9, wherein said additional gripping member has a rectangular shape.

11. The fastener of claim 1, wherein said fastener body includes a radially outwardly extending lip between said sleeve and said threaded end of said fastener body.

12. The fastener of claim 1, wherein said sleeve is a planar plate and said gripping members are embossments in said plate.

13. The fastener of claim 1, wherein said gripping members are circumferentially offset from each other.

14. The fastener of claim 1, wherein the maximum radial distance for a first gripping member is smaller than the maximum radial distance for a second gripping member, which is smaller than the maximum radial distance for a third gripping member, the first gripping member located closer to the tapered end of the fastener body than the second gripping member, the second gripping member located closer to the tapered end of the fastener body than the third gripping member.

15. A fastener comprising:
   an integral fastener body having a threaded portion, an opposing tapered portion, and a radially outwardly extending lip, said tapered portion including an outwardly angled surface; and
   a clip slidably connected to said fastener body between said tapered portion and said lip, said clip having a clip body including a plurality of at least partially separated fingers, each of said fingers including at least three axially spaced gripping members each protruding a maximum radial distance outwardly from said clip body, the maximum radial distance progressively increasing from the tapered portion to the threaded portion of the fastener body, at least two of said gripping members being circumferentially offset from each other, wherein after the fastener is inserted in a borehole formed in a substrate and while a fastening member is threaded onto said threaded portion and tightened, said clip progressively moves along said angled surface causing said fingers to move outwardly and at least two of said gripping members to sequentially engage an inner surface of the substrate forming the borehole to secure the fastener in the borehole.

16. The fastener of claim 15, wherein at least two of said gripping members have a triangular shape.

17. The fastener of claim 15, wherein two of said gripping members have a triangular shape and the other of said gripping members has a rectangular shape.

18. The fastener of claim 15, wherein said clip is a planar plate and said gripping members are embossments in said plate.

19. The fastener of claim 15, wherein the maximum radial distance for a first gripping member is smaller than the maximum radial distance for a second gripping member, which is smaller than the maximum radial distance for a third gripping member, the first gripping member located closer to the tapered end of the fastener body than the second gripping member, the second gripping member located closer to the tapered end of the fastener body than the third gripping member.

20. A fastener comprising:

an integral fastener body having a threaded portion, an opposing tapered portion and a radially outwardly extending lip, the tapered portion including an outwardly angled surface; and a clip slidably connected to the fastener body between the tapered portion and the lip, said clip having a clip body including plurality of at least partially separated fingers, each of said fingers including at least three axially spaced gripping members each protruding radially outwardly from the clip body, at least two of the gripping members being circumferentially offset from each other, at least two of the gripping members being triangular and at least one of the gripping members being rectangular, wherein after the fastener is inserted in a borehole formed in a substrate and while a fastening member is threaded onto said threaded portion and tightened, said clip progressively moves along said angled surface causing said fingers to move outwardly and at least two of said gripping members to sequentially engage an inner surface of the substrate forming the borehole to secure the fastener in the borehole.

* * * * *